S. LAKE.
FLY WHEEL.
APPLICATION FILED JUNE 14, 1917.
1,272,061.
Patented July 9, 1918.
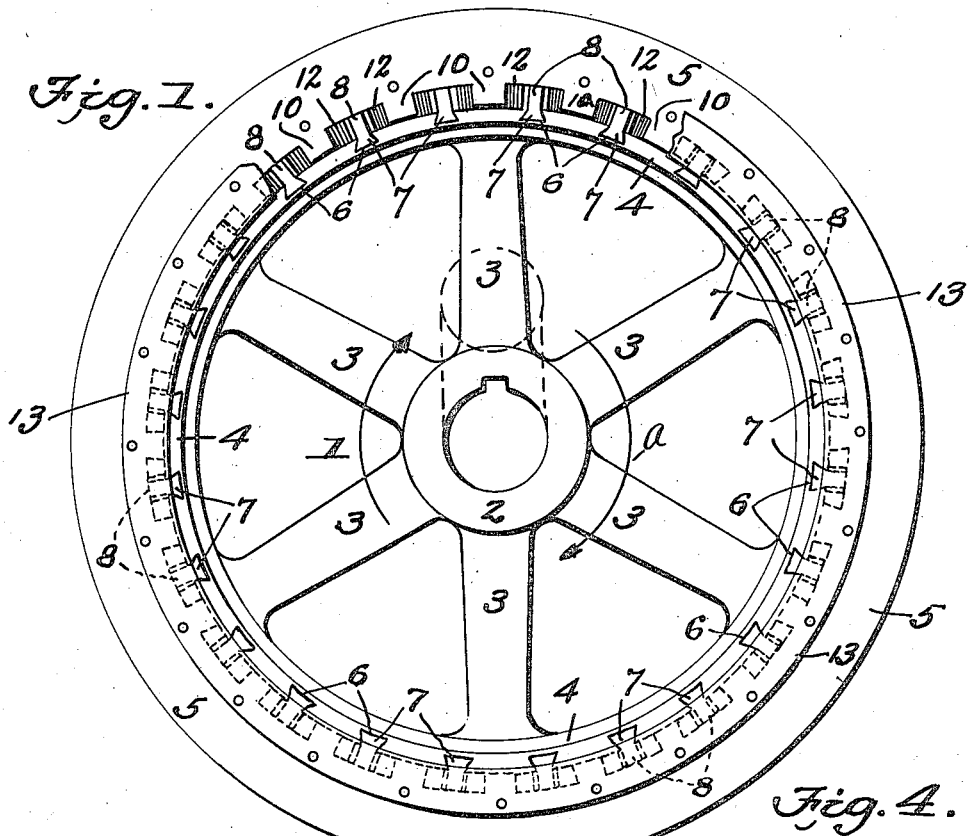
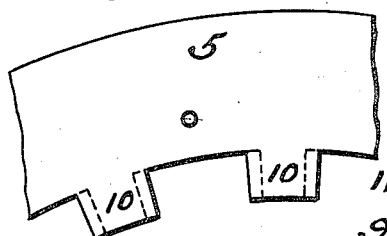
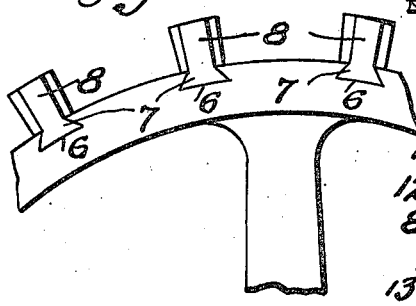
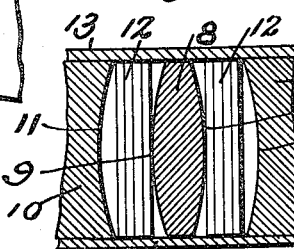
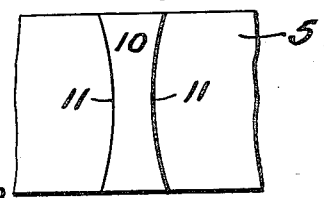
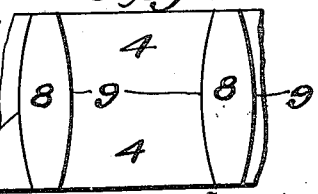
Inventor
Simon Lake
by
Mercer D Blondel
Attorney

UNITED STATES PATENT OFFICE.

SIMON LAKE, OF MILFORD, CONNECTICUT.

FLY-WHEEL.

1,272,061. Specification of Letters Patent. Patented July 9, 1918.

Application filed June 14, 1917. Serial No. 174,687.

*To all whom it may concern:*

Be it known that I, SIMON LAKE, a citizen of the United States, residing at Milford, in the county of New Haven and State of Connecticut, have invented certain new and useful Improvements in Fly-Wheels, of which the following is a specification.

The invention relates to improvements in fly wheels, and particularly those employed in connection with internal combustion engines of the high compression type, wherein high compressions and consequent high explosive forces are employed, both in the starting of the engine and in the reversing movement of the engine. The object of the invention is to provide a fly wheel to relieve the strain imposed upon the crank shaft during the starting and reversing movement of the engine, and to thus prevent injury to the crank shaft and to its connections incident to the sudden starting and the reversing movement of the engine.

I have found from experience with internal combustion engines used upon marine vessels, that excessive strains are brought to bear upon the crank shafts and upon their connection with the various auxiliary machinery to which the crank shafts are connected, and that crystallizations of the crank shafts or the auxiliary shafts take place, hence creating weaknesses in the shafts which cause them to break or crack so that the shafts are rendered useless. It is well known, that, in high speed internal combustion engines such failures are of frequent occurrence, and it is the purpose of my invention to overcome these defects. Such disasters are caused primarily through the necessity of the employment of heavy fly wheels, said fly wheels being, necessarily of such weight as to provide an accumulation of force so that their inertia will compensate for the fluctuation of speed that may be occasioned by variable pressures of the power strokes of the engine in order to carry the cranks over a dead center.

Heretofore, fly wheels of such engines have been made with a solid rim of sufficient weight to carry the cranks of the shaft over the dead centers, the rapid revolution of the wheel serving, through the weight of the rim of the wheel, to accomplish this end. It will be understood, that in internal combustion engines there are hundreds of explosions on the piston per minute, and that variable strains are, in consequence, brought to bear upon the crank shaft of the engine, and through it, upon the shafts for the auxiliary machinery to which the crank shaft is geared, thus causing them not only to crack, but to twist so that the cranks are thrown out of alinement, due to the well known fact that a multitude of "blows", or sudden changes of stress, produce crystallization of metals. I overcome these difficulties by providing the rim of a fly wheel with yielding sections, whereby a limited yielding or cushioning effect is imparted to the crank shaft so as to relieve it and its connections of excessive sudden shocks or strains ordinarily imposed thereon.

The invention consists in certain novel details of construction and combinations of parts as will be hereinafter fully described and then claimed.

In the drawings, illustrating the invention, in the several figures of which like parts are similarly designated:—

Figure 1 is an elevation of a fly wheel embodying my improvements, parts being broken away in order to clearly illustrate the arrangement of the several parts thereof.

Fig. 2 is a fragmentary view, drawn on a larger scale, of the inner face of the outer rim of the fly wheel.

Fig. 3 is a similar view of an outer portion of the inner section of the fly wheel.

Fig. 4 is a diagrammatic view, drawn on a larger scale, illustrating the shape of the ribs of the outer section of the wheel.

Fig 5 is a similar view illustrating the shape of the ribs of the inner section of the fly wheel.

Fig. 6 is a sectional view, drawn on a larger scale, on the lines 6—6 of Fig. 1, showing the movable rim and fixed section of the rim in a neutral position.

Fig. 7 is a similar view showing the relative position of the parts when the wheel is in motion.

1 indicates my improved fly wheel, comprising a hub 2 and spokes 3 of usual form and construction. The rim of the wheel is constructed of an inner section 4 and an outer section 5, the said inner section having a plurality of transversely arranged dovetail grooves 6, in which are fitted the inner dovetail ends 7 of ribs 8, said ribs 8 having their opposite faces convex, as shown at 9 (Figs. 5, 6, and 7). The outer section 5 of the rim is provided with transversely arranged ribs 10, which may be cast integral with the said section, or fitted thereto in the same manner as the ribs 8, and these ribs 10 have their opposite faces concaved as shown at 11. As shown in Fig. 1, the ribs 8 and 10 are substantially of the same depth, and fitted between the spaces thus formed when the outer section 5 is positioned upon the rim 4, are leaf springs 12 of a length equal to the width of the rim. As shown most clearly in Fig. 6, the members of the springs 12, adjacent to the ribs 8, engage only the crown of the said ribs, while the outer members, so to speak, of each set of springs, bear only at their ends against the ends of the concaved ribs 10, so that a space is left between the spring members and the ribs.

The action of the heavy rim of the fly wheel of an engine, when the engine is in motion, is as follows:—

Assuming that the engine is running in the direction of the arrow and that the fuel in the cylinder is ignited, as is the usual practice, when the crank is near the top of the stroke, the pressure in the cylinder immediately "jumps up," so to speak, to several hundred pounds pressure per square inch. It is common practice to ignite the fuel just before the crank of the power shaft reaches the top of its stroke, so that the maximum pressures are reached just before and after the crank pin passes the top or dead center, (in a single acting vertical engine), such as would be used with engines designed for marine purposes. In high speed vertical marine engines of the explosive type, ignition sometimes takes place twenty-five or thirty degrees before reaching the top center. In such cases the momentum of the fly wheel rim is relied upon to carry the piston up against this explosive or compression force, in which case the tendency of the fly wheel rim 5 is to travel in the direction of the arrow a, while the compression forces within the cylinder tend to drive the crank in the opposite direction. Therefore, the fly wheel rim would move forward or slide upon the inner section in the direction of the arrow. The moment the crank pin passes the dead center, however, the high pressures within the cylinder would reverse the torsional stress in the crank shaft and cause the crank shaft to jump ahead in the direction of the rotation with increased speed. The heavy rim of the fly wheel would then lag behind the inner section 4 of the crank shaft, and the rim 5 would slide backward in relation to the inner section 4, until the crank pin neared the bottom of the strokes, where the speed of the wheel would catch up to the speed of the crank pin caused by the initial explosion when the stress of the crank shaft would be again changed, due to the necessity of compressing the air preparatory to an additional explosion. The effect, therefore, is to give, with each revolution, two changes of direction of stress in the metal of the crank shaft. It is this constant change of stress which causes crystallization, and it will be readily understood that the insertion of elastic means between the section 4, secured rigidly to the crank shaft, and the rim 5 rotatably mounted thereon, will cushion and reduce the shock, and, therefore, the crystallization of the shaft and its tendency to break down.

The ribs 8 and the springs 12 are held against displacement by flat rings or plates 13, bolted or otherwise fastened to the sides of the wheel.

It will be understood that while I have described my invention as applicable to marine engines, it will be particularly understood that the invention is equally applicable to stationary engines. It will also be understood that by my peculiar construction of my invention, that no matter in which direction the fly wheel may be operated, the sudden reversing movement thereof will be cushioned, and that shock upon the crank shaft will be prevented during both the compression and power stroke.

What I claim is:—

1. A fly wheel, having its rim constructed of two sections, the inner section of which is provided with a plurality of transversely arranged ribs having convex sides, the outer section of said rim having a plurality of ribs formed with concave sides, spring members adapted to fit within the spaces formed by and between said ribs, and means carried by one of said sections for holding said sections and said springs against displacement.

2. A fly wheel, having its rim constructed of an inner section and an outer section of heavy weight, each section having a plurality of transversely arranged ribs, the ribs of the inner section having convex sides and the ribs of the outer section having concave sides, leaf springs arranged in the spaces formed by and between said ribs, and means carried by one of said rim sections for holding said sections and said spring members in position.

3. A fly wheel, having its rim constructed of an inner section and an outer section, said inner section having a plurality of ribs dovetailed therein and having convex sides, said outer section having a plurality of ribs adapted to fit within the spaces formed by the ribs of said inner section and having concave sides, leaf springs adapted to fill the spaces thus formed between said ribs, said leaf springs adapted to engage the crowns of the convex surfaces of the convex ribs and the ends of the concave ribs, and means carried by one of said rim sections for holding said sections and said ribs against displacement.

4. In combination with the power shaft of an engine, a fly wheel mounted upon said shaft, having a fixed rim section and a movable rim section mounted on said first mentioned rim section, said sections having a plurality of transversely arranged ribs, having respectively concave and convex surfaces, leaf springs arranged within the spaces formed by said ribs, and means carried by one of said rim sections for holding said ribs and said springs against displacement.

5. In combination with the power shaft of an engine, a fly wheel mounted upon said shaft having a fixed rim section and a movable rim section mounted thereon, said fixed rim section having a plurality of ribs provided with convex sides and said movable section having a plurality of ribs provided with concave sides, said ribs being adapted to form a plurality of spaces, leaf springs arranged within the spaces formed by said ribs, and annular rings or plates carried by one of said rim sections and adapted to overlap the ribs and springs of the other section whereby to hold said rim sections and said springs against displacement.

6. In combination with the power shaft of an engine, a fly wheel mounted upon said shaft having a fixed rim section and a movable rim section mounted upon said first mentioned rim section, said fixed rim section having a plurality of transversely arranged ribs dovetailed therein and having convex sides, said outer section provided with a plurality of inwardly extending transversely arranged ribs formed with concave sides, leaf springs arranged within the spaces formed by and between the said ribs, and means carried by one of said rim sections to prevent the displacement of said rim sections and said springs.

In testimony whereof I have hereunto set my hand this 28th day of May, A. D. 1917.

SIMON LAKE.

Witnesses:
 M. D. BLONDEL,
 M. E. HITCHCOCK.